Figure 1:
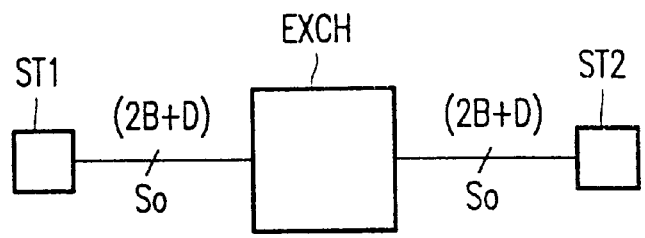

United States Patent [19]
Weishut et al.

[11] Patent Number: 6,047,057
[45] Date of Patent: *Apr. 4, 2000

[54] TELECOMMUNICATION SYSTEM INTRUDING ON A BUSY CALLED PARTY

[75] Inventors: Gideon M. R. Weishut, Eindhoven; Mascha M. C. C. Van Ooster-Hout, Hilversum; Walter J. Slegers, Eindhoven, all of Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/706,112

[22] Filed: Aug. 30, 1996

[30] Foreign Application Priority Data

Aug. 31, 1995 [EP] European Pat. Off. .............. 95202349

[51] Int. Cl.⁷ ..................................................... H04M 3/42
[52] U.S. Cl. ......................... 379/215; 379/210; 379/93.35
[58] Field of Search ............................... 379/34, 35, 67.1, 379/68, 69, 70, 96, 142, 159, 208, 215, 210, 211, 93.35

[56] References Cited

U.S. PATENT DOCUMENTS

| | | | |
|---|---|---|---|
| 4,661,975 | 4/1987 | Brecher | 379/361 |
| 4,794,639 | 12/1988 | Urui et al. | 379/215 |
| 5,228,073 | 7/1993 | Smith | 379/142 |
| 5,309,512 | 5/1994 | Blackmon et al. | 379/67 |
| 5,327,486 | 7/1994 | Wolff et al. | 379/96 |
| 5,425,097 | 6/1995 | Pula | 379/215 |
| 5,533,102 | 7/1996 | Robinson et al. | 379/67 |
| 5,625,676 | 4/1997 | Greco et al. | 379/88 |
| 5,680,447 | 10/1997 | Diamond et al. | 379/215 |
| 5,809,128 | 9/1998 | McMullin | 379/215 |
| 5,848,142 | 12/1998 | Yaker | 379/215 |

FOREIGN PATENT DOCUMENTS

| | | |
|---|---|---|
| 2258119 | 1/1993 | United Kingdom . |
| WO9623382 | 8/1996 | WIPO . |

OTHER PUBLICATIONS

Sopho–Set (D) User Guide, The Manual Of The Sopho–Set 375(D), p. 48, Undated.

*Primary Examiner*—Scott Wolinsky
*Assistant Examiner*—Benny Q. Tieu

[57] ABSTRACT

A telecommunication system is described which comprises at least a first and a second end station. The first end station enables intruding on the second end station if the latter is in a busy mode by sending an intrude message to the second end station. The second end station is configured for reproducing the intrude message. This makes it possible to intrude without disturbing the call being held by the second end station.

6 Claims, 4 Drawing Sheets

TELECOMMUNICATION SYSTEM INTRUDING ON A BUSY CALLED PARTY

The invention relates to a telecommunication system comprising at least a first and a second end station, the first end station comprising intruding means for intruding on a call of the second end station.

Such a telecommunication system is, for example, the SOPHO-S system manufactured by Philips. The SOPHO-S system comprises one or more private branch exchanges with end stations connected thereto. Page 48 of the SOPHO-Set S375(D) User Guide, the manual of the SOPHO-Set 375(D), one of the end stations suitable for the SOPHO-S system, published by Philips Communication Systems, Hilversum, The Netherlands, November 1990, describes the possibility of the intrusion by the first end station on the busy second end station. As a result of the intrusion, the call of the second end station taking place at that moment is interrupted, and the user of the first end station can hold a conversation with the user of the second end station. The intrude feature is meant to inform the user of the second end station of a particular urgent situation, even if this end station is in the busy mode. Such an urgent situation occurs, for example, if an urgent call intended for the user of the second end station arrives at the first end station. By intruding, the user of the first end station can tell the user of the second end station what person urgently wishes to speak to him, and consult with him what action he is to undertake: transferring the urgent call directly to the second end station, letting the person who urgently wishes to speak to the user of the second end station wait for a while, informing this person that the user of the second end station will call back at a later instant, etc. A drawback of intruding on the call is that the person the user of the second end station is speaking with at the moment of the intrusion, hears that there is an intrusion. This is annoying, because it has appeared that this person often gets the feeling from this intrusion that he is not taken seriously by the user of the second end station. A further drawback is that the user of the first end station is to estimate whether the importance of the urgent situation is such that an intrusion on the call of the second end station is justified. It happens that the user of the first end station is not good at making this estimation and possibly intrudes on the call of the second end station for unimportant matters. In consequence, not only the user of the second end station, but also the person this user is calling with at the moment of the intrusion, is disturbed unnecessarily.

It is an object of the invention to provide a telecommunication system as defined in the opening paragraph, in which another manner of intrusion is possible which does not have these drawbacks.

For this purpose, a telecommunication system as defined in the opening paragraph is characterized in that the intruding means are arranged for sending an intrude message to the second end station, and in that the second end station comprises reproducing means for reproducing the intrude message. Since an intrusion is made via an intrude message, the call of the user of the second end station taking place at the moment of the intrusion is not disturbed, and the person the user of the second end station is calling with at that moment will not notice the intrusion. It is up to the user of the second end station for whom the intrude message is intended to decide whether he wishes to terminate the call.

An embodiment of a telecommunication system according to the invention is therefore characterized in that the reproducing means are arranged for visually reproducing the intrude message. This is advantageous in that it is absolutely avoided that the person the user of the second end station is calling notices something of the intrusion. If the intrusion is indicated by means of a sound signal, there is a risk of this signal still being heard by the person the user of the second end station is calling with, because the sound signal is picked up by the microphone of the second end station.

A further embodiment of a telecommunication system according to the invention is therefore characterized in that the intrude message contains a standard part and a part that can be modified by a user. The standard part contains, for example, the words "urgent", "name", and "subject". The user part is the open part after the words "name" and "subject", intended for filling in the name of, for example, the person who urgently wishes to speak to the user of the second end station, and the subject matter this person wishes to speak about. In urgent situations, the intrude message can be quickly completed by the user of the first end station, because he only needs to fill in the user part. The user of the second end station can quietly read this message and then decide for himself whether the situation is such that he wishes to terminate his call.

A further embodiment of a telecommunication system according to the invention is characterized in that the standard part of the intrude message contains standard responses. As a result, the user of the second end station for whom the message is intended need not think of the formulation of a response message. This could divert his attention while he is having the conversation. Examples of standard responses are "I will call back", "let caller wait", "Transfer call now" and "Let caller call back later", but also other standard responses, which may be programmed by the user, are possible.

A further embodiment of a telecommunication system according to the invention is characterized in that the second end station is arranged for automatically returning a response message to the first end station after a standard response has been activated. As a result, the user of the second end station need not draw up a separate response message and send it during his telephone conversation. The response message sent automatically, contains the activated standard response, so that the user of the first end station knows the type of action he is to undertake.

These and other aspects of the invention will be apparent from and elucidated with reference to the embodiments described hereinafter.

Figure 2:
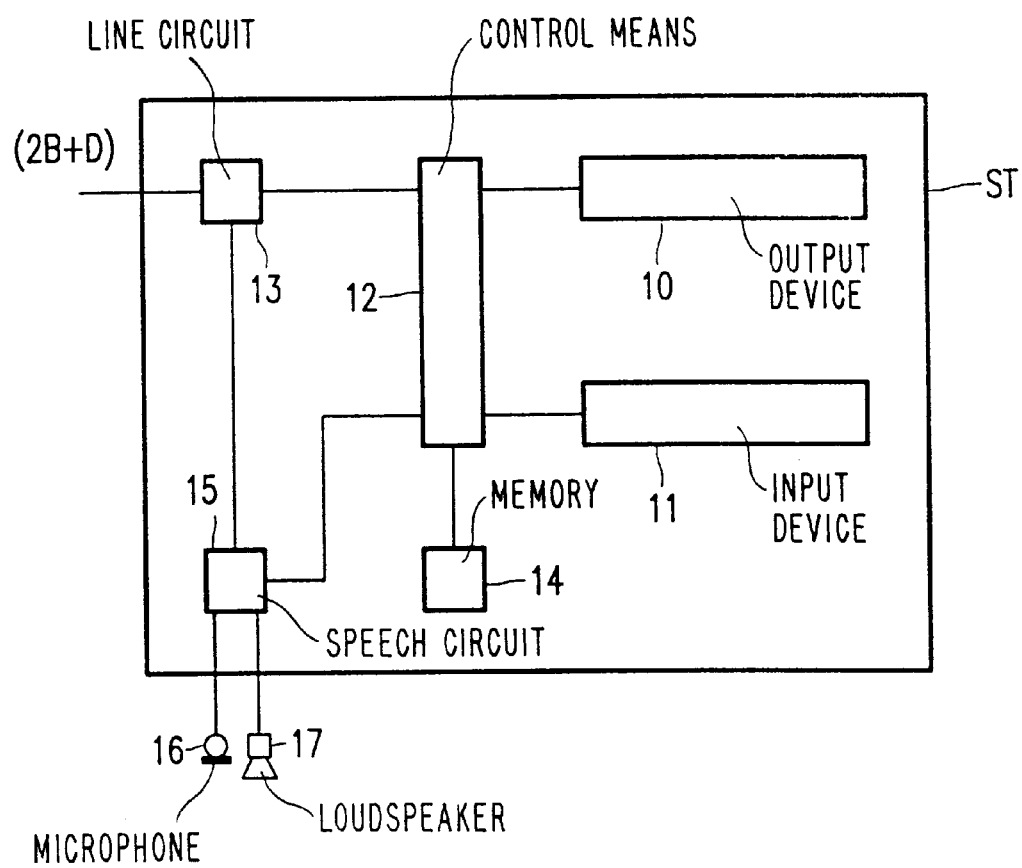
Figure 3:
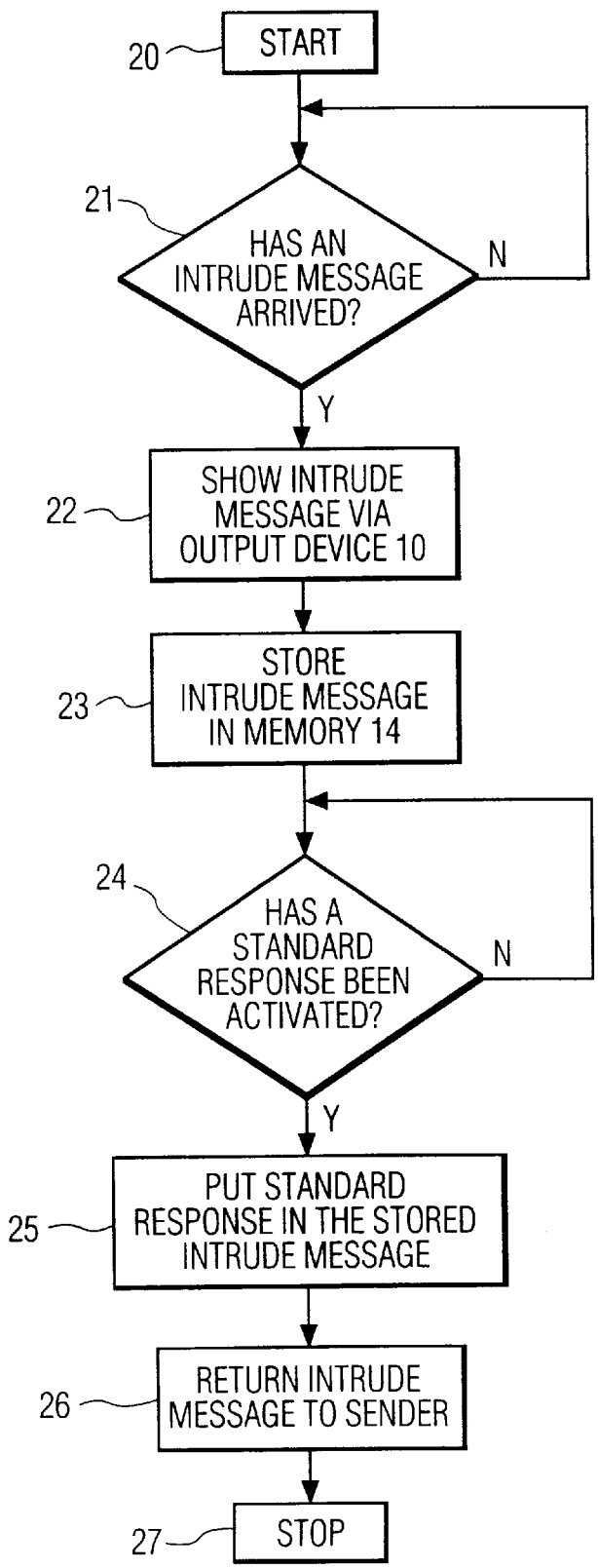
Figure 4A:
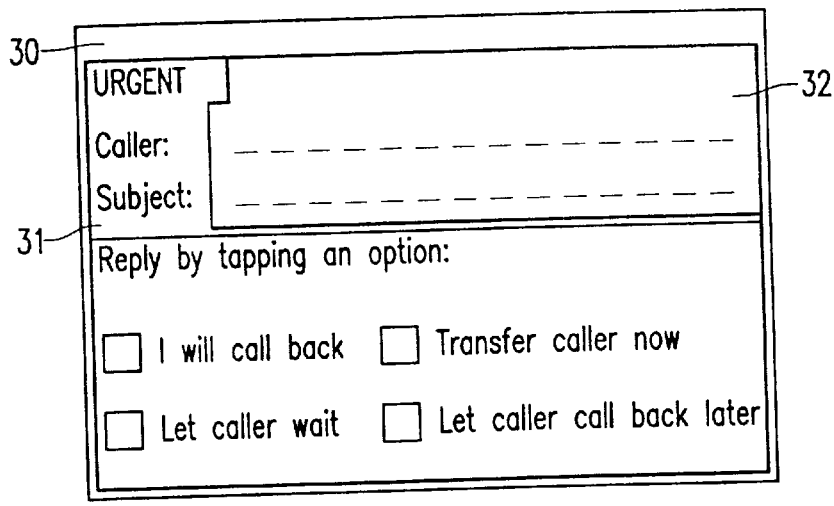
Figure 4B:
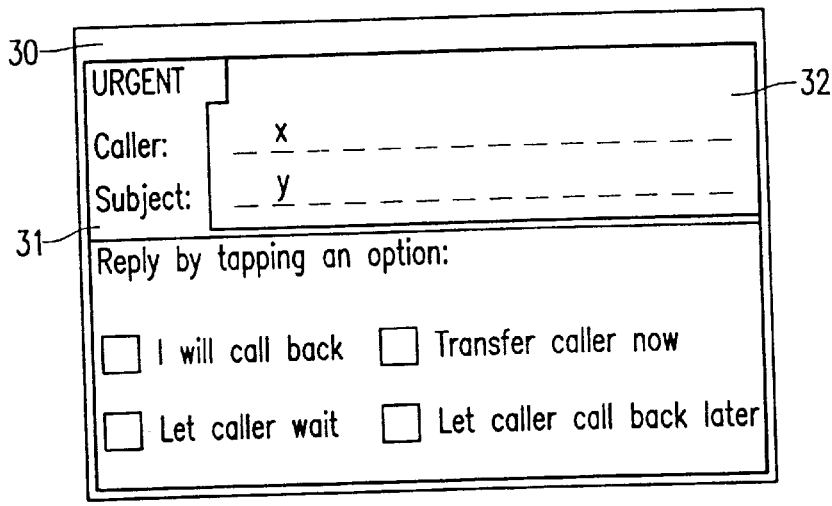
Figure 4C:
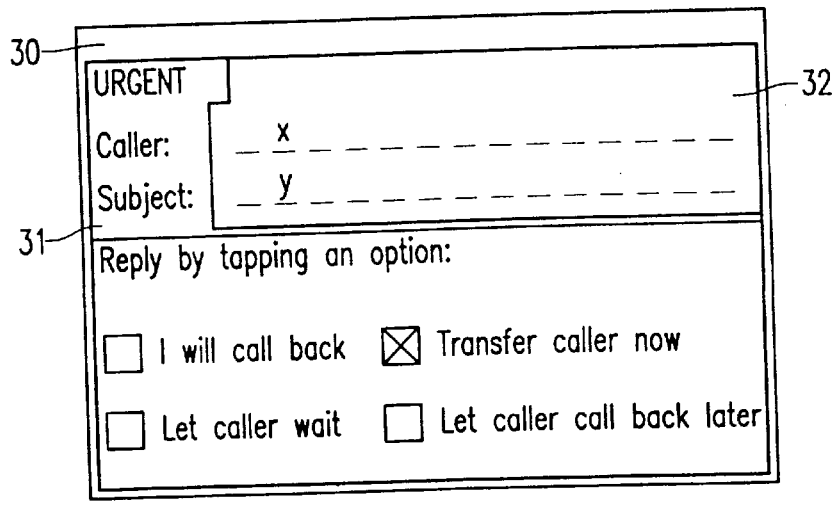
Figure 5:
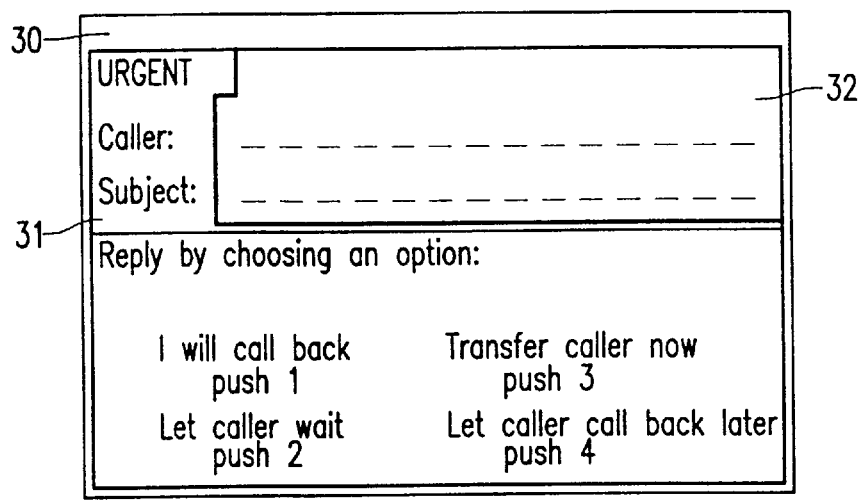
Figure 6:
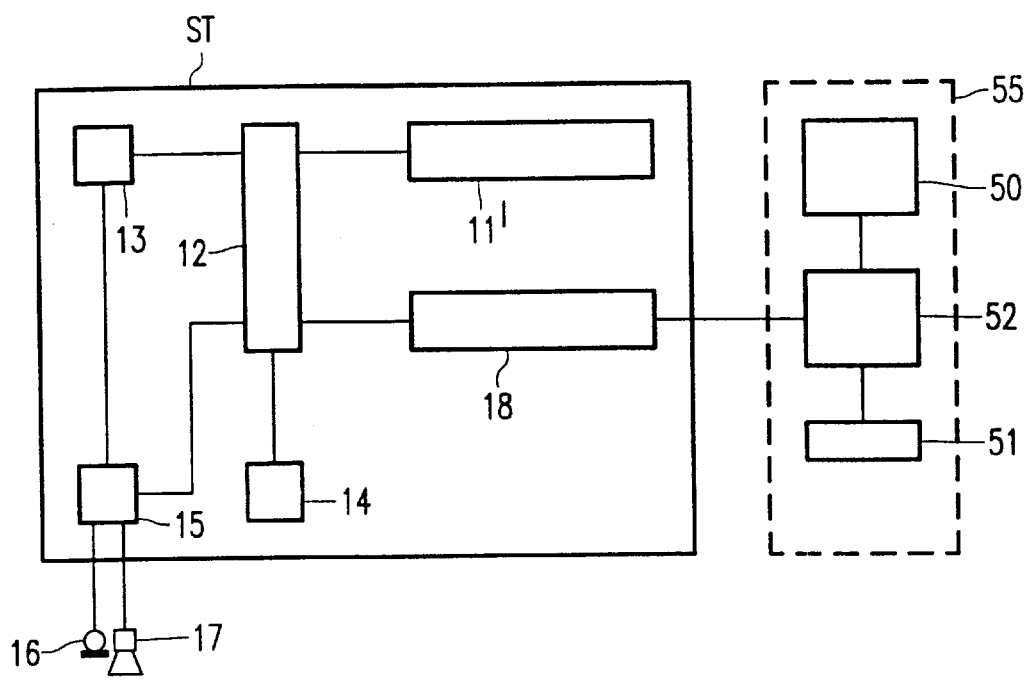

In the drawings:

FIG. 1 shows a telecommunication system according to the invention,

FIG. 2 shows in a block diagram an end station to be used in this telecommunication system, FIG. 3 shows a flow chart of the reception of an intrude message by an end station, FIG. 4a shows an intrude message according to the first embodiment of the invention, FIG. 4b shows this intrude message filled in, FIG. 4c shows this intrude message containing a selected standard response, FIG. 5 shows an intrude message according to the second embodiment of the invention, and FIG. 6 shows an end station coupled to a PC configuration.

FIG. 1 shows an ISDN (Integrated Services Digital Network) telecommunication system. This telecommunication system comprises an exchange EXCH and end stations ST. Two of these end stations ST1, ST2 are shown explicitly. The end stations are linked to the exchange via an S0-interface S0. The connection between the end stations and the exchange is formed by 2 user channels (2B) and one control channel (D).

FIG. 2 shows in a block diagram an end station ST according to the invention. Only the elements important to the invention are described. The end station comprises an output device 10 for reproducing information about the mode of the end station to the user, an input device 11 for the operation of the end station by the user, control means 12, a line circuit 13, a memory 14 and a speech circuit 15, coupled to a microphone 16 and a loudspeaker 17. The output device 10 is, for example, a small monitor or a display, but may alternatively comprise LEDs and possibly an additional loudspeaker for reproducing the sounds for drawing the user's attention to certain situations. The input device 11 is, for example, a keyboard, but may also comprise a monitor with a mouse or a touch screen with a pointer. With the mouse/pointer, desired commands can be clicked on on the monitor/touch screen. The control means 12, which are formed, for example, by a microprocessor, are primarily intended for setting up connections to other end stations. This is effected by sending and receiving standardized messages by the control channel. The control means further provide the reproduction of messages via the output device 10.

If the user of an end station has somebody on the line who urgently wishes to speak to the user of another end station, he/she sends an intrude message to this end station. This may be effected by depressing a preselection key "intrude" on the keyboard, if the input device is a keyboard, or, if the input device comprises a monitor with mouse or touch screen with pointer, by clicking on an icon that represents the intrude feature. In the simplest embodiment of the invention, an intrude message is then sent forthwith to the other end station, which leads to a LED of this other end station lighting up or blinking to indicate the intrusion, or leads to a sound being reproduced via an additional loudspeaker. Indicating the intrusion by means of sound does have the risk of the person the user of the other end station is calling with still notices something of this intrusion, because the sound is inadvertently sent back to him via the microphone of the other end station. Therefore, the intrusion is preferably indicated visually.

In a more advantageous embodiment, an intrude message is shown via the output device 10. This message is to be filled in and sent by the user. The intrude message filled in by the user of the end station is then shown on the other end station. The user of the other end station can read this message and decide for himself, whether this situation is important enough to terminate his call.

The intrude message can be sent in a manner known per se by user-to-user signalling by the control channel (D), but also one of the user channels (B) can be used for sending the intrude message. It is advantageous if the control means affix an indicator to the intrude message. This enables the receiving end station to recognize the intrude message as such and act accordingly.

FIG. 4a shows an intrude message 30 according to a first embodiment of the invention. The intrude message comprises a standard part 31 and a user part 32. The standard part contains the standard words "caller" and "subject". The user can optionally use the input device for filling in the sections behind these words in the user part. This is shown in FIG. 4b. The message further contains a number of standard responses in the standard part:

I will call back
Let caller wait
Transfer caller now
Let caller call back later.

The user can give a standard response, for example, by bringing a cursor to the standard response and depressing a confirmation key, or by touching the standard response on the touch screen with a pointer, naturally in dependence on the type of input and output device the end station has. An intrude message with an activated standard response is shown in FIG. 4c. When a standard response is activated, the intrude message is returned to the sender, as has already been described.

Needless to observe that it is possible to modify the layout of the standard part shown in FIG. 4. For example, it is possible to give different standard responses to the message, which responses can be programmed by the user himself.

A further possibility is displaying the intrude message simultaneously on the first and second end stations. As a result, the user of the first end station directly notices which standard response the user of the second end station has selected.

FIG. 3 shows a flow chart of the reception of an intrude message by an end station. The blocks have the following connotations:

| Block: | Connotation: |
|---|---|
| 20 | Start |
| 21 | Has an intrude message arrived? |
| 22 | Show intrude message via output device 10 |
| 23 | Store intrude message in memory 14 |
| 24 | Has a standard response been activated? |
| 25 | Put standard response in the stored intrude message |
| 26 | Return intrude message to sender |
| 27 | Stop |

In block 21 there is tested whether an intrude message has arrived. This is effected, for example, by looking whether the incoming user-to-user messages contain an indicator that belongs to an intrude message. If this is the case, the intrude message is shown by the output device (block 22) and stored in memory 14 (block 23). In addition to the message, also the number of the sender is stored. This is necessary for automatically returning the intrude message at a later stage. In block 25 a test is made whether a standard response has been activated. If it has, this is put in the stored intrude message in block 26. In block 27 the intrude message is returned to the sender while the stored number of the sender is utilized. Needless to observe that the flow chart shown here is not the only way for an end station to handle a received intrude message, but other ways are possible too.

FIG. 5 shows an intrude message according to a second embodiment of the invention. It is not necessary to activate the standard response by means of a cursor, mouse or pointer. This is done, however, by depressing a preselection key. The control means have stored in the memory the relation between the standard responses and the keys. As a result, it is possible to put the associated response in an intrude message after depressing such a key, and return the message to the sender.

FIG. 6 shows an end station coupled to a Personal Computer configuration. The references in the end station have like connotations to those of FIG. 2. The end station does not comprise an output device 10, and a standard telephone keypad 11' is used as an input device. The control means are coupled to the PC configuration 55 via an interface. This PC configuration 55 comprises a monitor 50, an alphanumeric keyboard 51 and a computer 52. In lieu of filling in the intrude message by the keyboard of the end station itself, this message may also be filled in by the keyboard belonging to this computer, if the computer 52 has suitable software. A received intrude message may be displayed on the monitor 50 belonging to the computer. The end station and the PC configuration are coupled in a fashion known per se, for example, by an RS232 interface.

The invention has been described with reference to a number of embodiments. These embodiments, however, are only intended as an example of which, needless to observe, variations are possible. The invention may also be used, for example, in a system for cordless telephony. Such variations are also covered by the protective scope of the invention.

What is claimed is:

1. Telecommunication system comprising at least a first, a second, and a third telephone end station, the first telephone end station comprising telephone intruding means for intruding upon a user of the second telephone end station while the user of the second telephone end station is engaged in a telephone conversation with the third telephone end station, without intruding the telephone conversation itself, the telephone intruding means being arranged for directly sending a telephone intrude message from the first telephone end station to the second telephone end station, and the telephone intrude message comprising a standard part with standard responses, and the second telephone end station comprising interpreting and reproducing means for interpreting and visually reproducing the telephone intrude message, and the second end station being arranged for automatically returning a response message to the first end station after one of the standard responses has been activated by the user of the second end station.

2. A telecommunication system as claimed in claim 1, wherein the first telephone end station comprises user programmable means for programming the standard responses.

3. A telecommunication system as claimed in claim 1, wherein the telephone intrude message further comprises a part to be modified by a user of the first telephone end station.

4. A telecommunication system as claimed in claim 1, wherein the reproducing means comprises a display screen for displaying the intrude message, and the second telephone end station comprises means for interactively cooperating with the display screen, the user of the second telephone end station selecting the one of the standard responses displayed on the display screen, and upon selection of the one of the standard responses the second telephone end station returning the response message.

5. First telephone end station for use in a telecommunication system comprising at least two other telephone end stations, the first telephone end station comprising telephone intruding means for intruding upon a user of one of the at least two other telephone end stations while the user of the one of the at least two other telephone end stations is engaged in a telephone conversation with another user of another one of the at least two other telephone end stations, without intruding upon the telephone conversation itself, the telephone intruding means being arranged for directly sending a telephone intrude message from the first telephone end station to the one of the at least two other telephone end stations, the telephone intrude message comprising a standard part with standard responses, and the one of the at least two other telephone end stations comprising interpreting and visually reproducing means for interpreting and reproducing the telephone intrude message, and the one of the at least two other telephone end stations being arranged for automatically returning a response message to the first end station after one of the standard responses has been activated by the user of the one of the at least two end stations.

6. Second telephone end station for use in a telecommunication system comprising at least two other telephone end stations, of which one telephone end station comprises telephone intruding means for intruding upon a user of the second telephone end station while the user of the second telephone end station is engaged in a telephone conversation with another user of another one of the at least two other telephone end stations, without intruding upon the telephone conversation itself, the second telephone end station comprising interpreting and reproducing means for interpreting and visually reproducing a telephone intrude message directly received from the one of the at least two other telephone end stations, the telephone intrude message comprising a standard part with standard responses, and the second telephone end station being arranged for automatically returning a response message to the first end station after one of the standard responses has been activated by the user of the second end station.

* * * * *